United States Patent [19]

Kelly et al.

[11] 4,436,394

[45] Mar. 13, 1984

[54] SYSTEM AND METHOD FOR CONTROLLING THE EXPOSURE OF COLOR PICTURE TUBE PHOSPHOR SCREENS

[75] Inventors: William R. Kelly; Ernesto J. Alvero, both of Lancaster, Pa.

[73] Assignee: RCA Corporation, Princeton, N.J.

[21] Appl. No.: 267,750

[22] Filed: May 28, 1981

[51] Int. Cl.³ .............................................. G03B 41/00

[52] U.S. Cl. ........................................ 354/1; 250/205; 430/24

[58] Field of Search ................ 250/205, 559; 356/443, 356/444; 430/24, 30; 354/1

[56] References Cited

U.S. PATENT DOCUMENTS

| | | | |
|---|---|---|---|
| Re. 21,907 | 9/1941 | Balsley . | |
| 3,636,836 | 1/1972 | Maddox et al. | 354/1 |
| 3,737,617 | 6/1973 | Llop et al. . | |
| 3,949,226 | 6/1976 | Dugan | 430/24 |
| 4,009,387 | 2/1977 | Nuver | 250/205 |
| 4,053,906 | 10/1977 | Schultz | 430/24 X |
| 4,059,834 | 11/1977 | Hosokoshi et al. | 430/24 X |
| 4,222,642 | 9/1980 | VanNes | 354/1 |
| 4,226,513 | 10/1980 | Shimoma et al. | 354/1 |
| 4,256,390 | 3/1981 | Fisher et al. | 354/1 |

*Primary Examiner*—David C. Nelms
*Assistant Examiner*—Edward P. Westin
*Attorney, Agent, or Firm*—Eugene M. Whitacre; Dennis H. Irlbeck; Lester L. Hallacher

[57] ABSTRACT

The light intensity-exposure time product of a lighthouse used in the manufacture of phosphor screens for color picture tubes is held constant despite changes in the shadow mask light transmission characteristic and power supply variations. The power provided to the exposing lamp is monitored and converted to a square wave output having a frequency which varies with the power. The frequency variations change the exposure time inversely with the frequency changes to maintain the light intensity-exposure time product constant.

10 Claims, 2 Drawing Figures

SYSTEM AND METHOD FOR CONTROLLING THE EXPOSURE OF COLOR PICTURE TUBE PHOSPHOR SCREENS

BACKGROUND OF THE INVENTION

This invention relates generally to the production of phosphor screens for color picture tubes and particularly to a system and method for maintaining a constant light intensity-time multiple in a lighthouse used to produce such screens.

A color picture tube includes a screen composed of triads of different phosphors which emit different colored light when excited by electrons. Typically, the screen is composed of alternating stripes of phosphors which respectively emit red, green and blue light. Positioned between the screen and the electron gun from which the exciting electrons emanate is a color selection electrode, commonly called a shadow mask. The shadow mask assures that the electron beams excite phosphor stripes of the proper color.

During the production of the phosphor screen, the entire inside surface of the panel is coated with one of the phosphors mixed in photosensitive material. The shadow mask is then inserted into the panel and the assembly is placed onto a lighthouse which contains a light source. Light from the light source passes through the apertures in the shadow mask and exposes some of the phosphor. The shadow mask is then removed and the unexposed phosphor is washed away leaving only the exposed phosphor. This process is then repeated for the remaining two colors of phosphors.

Consistent quality of the screens is essential and therefore any changes in the intensity of the exposing light must be accommodated. The intensity of the light can vary due to either variations in the input power or because of degregation of the lamp. Additionally, when panels for various sizes of tubes are randomly placed onto the lighthouse the exposure must be changed. In either event, as the intensity of the lamp changes, the exposure time must be proportionately and inversely changed in order to maintain a constant intensity-time multiple. Additionally, a change in the shadow mask light transmission characteristics also require a change in the exposure time.

The instant invention is directed to a system for maintaining a constant light intensity-exposure time multiple to assure uniform exposure of the phosphors in color television screens.

CROSS REFERENCE TO RELATED APPLICATIONS

The invention described in U.S. application Ser. No. 267,991 now U.S. Pat. No. 4,370,036 entitled "System And Method For Intermittently Moving A Picture Tube Panel On A Lighthouse" filed of even date herewith by W. R. Kelly and E. J. Alvero and assigned to RCA Corporation, the assignee of the instant application, can be used as the motor control in the instant invention.

U.S. application Ser. No. 267,749entitled "System and Method For Determining The Light Transmission Characteristics Of Color Television Shadow Masks" filed of even date herewith by E. J. Alvero and W. R. Kelly and assigned to RCA Corporation, the assignee of the instant application, can be used as the preset exposure time system used in the instant invention.

SUMMARY OF THE INVENTION

A lighthouse used to expose the actinic energy sensitive coating on the inside surface of a picture tube faceplate panel includes an actinic energy source and a power supply for energizing the energy source. A system for maintaining a constant energy intensity-exposure time relationship includes means responsive to the power which energizes the actinic energy source to provide an output signal having a characteristic related to the intensity of the energy. The output signal is coupled to another means which provides a control signal having a time dependent characteristic determined by the intensity related characteristic of the output signal. The control signal controls the exposure of the actinic energy sensitive coating in accordance with the energy intensity of the source and the time dependent characteristic.

DETAILED DESCRIPTION OF THE PREFERRED EMBODIMENT

Figure 1:
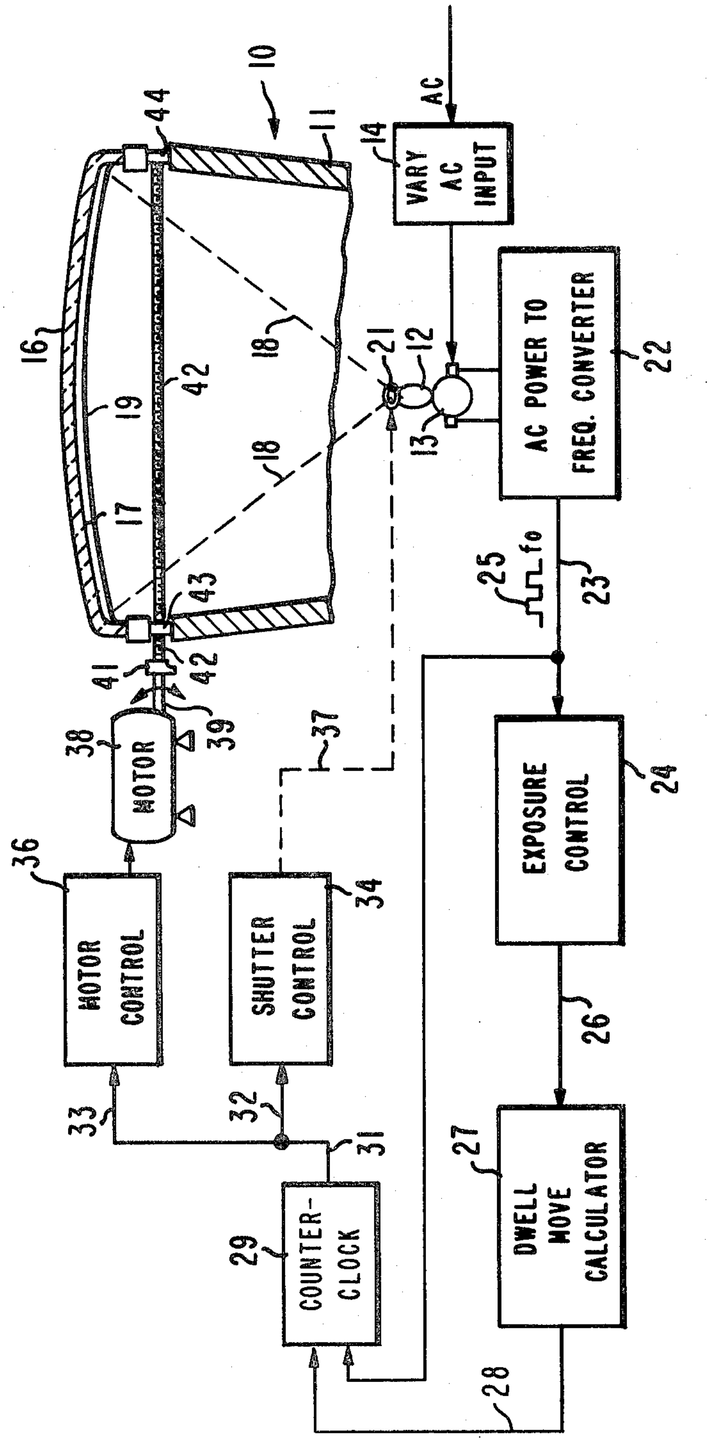
FIG. 1 is a simplified diagram of a preferred embodiment.

In FIG. 1, a Lighthouse 10 of known type includes a Housing 11, shown simplified and partially broken away. The Lighthouse 10 includes an actinic energy source which, typically, in the manufacture of color television screens is a Mercury Arc Lamp 12. A Power Supply 13, of known type, energizes the Lamp 12. AC power is applied to the Power Supply 13 through a Variable Input Circuit 14 to permit desired variations of the AC power supplied to the Lamp 12.

A Picture Tube Faceplate Panel 16 is positioned on the Lighthouse 10. The inside surface of the Panel 16 is provided with a screen in the form of a Coating 17 of actinic energy sensitive material which chemically reacts when exposed to Light Rays 18 eminating from the Lamp 12. Typically, in color picture tubes, the actinic energy sensitive material may be a mixture of phosphor particles, a polyvinyl alcohol and a soluble sensitizer, such as ammonium dischromate, for the alcohol. Arranged between the Lamp 12 and the Coating 17 is a Shadow Mask 19. The Shadow Mask 19 contains apertures through which electrons pass to excite the screen when the kinescope is in operation. The light from the Lamp 12 therefore passes through the shadow mask apertures and exposes the aperture pattern onto the Coating 17. Any variation in the power to the Lamp 12 will cause the lamp intensity to vary resulting in different exposure of the phosphor coating and a lack of uniformity in the screen produced on the Lighthouse 16. This is avoided by monitoring the power output of the Power Supply 13 and generating an output signal which reflects the changes in the energizing power. The output signal is used to generate a control signal having a time dependent characteristic determined by the power changes.

A Shutter 21, of known type, is arranged between the Lamp 12 and the Coating 17 and is used to control the inpingement of Light Rays 18 on the Coating 17 by opening and closing the shutter. This technique is well known in lighthouse and color picture tube screening art and accordingly, additional details are not presented herein.

The energizing power to the Power Supply 13 is monitored by an AC To Frequency Converter 22. The Output Signal 25 of the Frequency Converter 22 is a binary signal, such as a square wave, having a Frequency $f_o$. This signal is coupled to a Line 23 to an Exposure Control Circuit 24, the details of which are explained hereinafter with reference to FIG. 2. The output signal of the Exposure Control 24 is coupled by a Line 26 to a Dwell-Move Calculator 27, the operation of which is fully described in previously referenced U.S. Pat. No. 4,370,036. The Dwell-Move Calculator 27 moves the Panel 16 in incremental fashion to remove undesirable variations in the widths of the phosphor lines within the screen which occur during constant panel motion, this affect is commonly called "snake". Accordingly, if desired, the Dwell-Move Calculator 27 can be eliminated from the instant invention.

An Output Line 28 couples the output signal of the Dwell-Move Calculator 27 to a Counter-Clock 29. The Counter-Clock 29 provides output pulses on an Output Lead 31 in accordance with the Frequency $f_o$ of the square wave Control Signal 25 provided by the Power to Frequency Converter 22. The Lead 31 is connected to Leads 32 and 33 which respectively are the input leads of a Shutter Control 34 and a Motor Control 36. The Shutter Control 34 is coupled by a Lead 37 to the Shutter 21 to control the exposure of the Coating 17 by light from the Lamp 12. The output signal of the Motor Control 36 is provided to a Motor 38, such as a stepping motor. The Shaft 39 of the Motor 38 is connected by a Coupling 41 to a Lead Screw 42 which is fed through Threaded Mounting Brackets 43 and 44. Accordingly, rotation of the Shaft 39 results in linear movement of the Panel 16 with respect to the Lighthouse 10 in a manner and for reasons fully described in previously referenced U.S. Pat. No. 4,370,036. The referenced patent also shows the details of the Motor Control 36 and the disclosure thereof is incorporated by reference herein.

Figure 2:
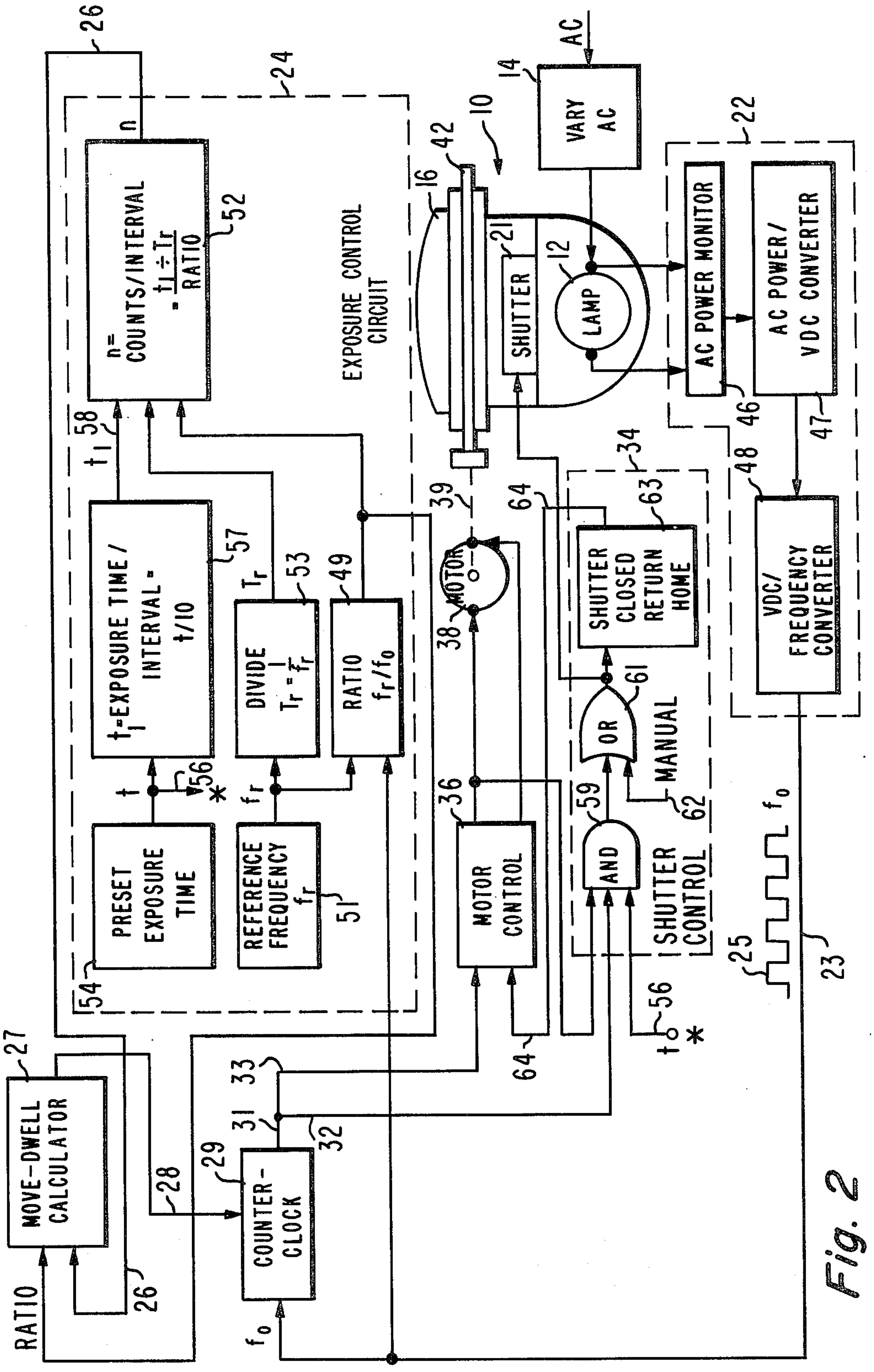
FIG. 2 shows the preferred embodiment of FIG. 1 in more detail.

In FIG. 2, the AC power to the Lamp 12 from the Variable Input 14 is monitored by an AC Power Monitor Circuit 46. The power output level of the Monitor 46 is directly related to the intensity of the light from the Lamp 12. Accordingly, variations of the light intensity, which are caused by variations in the input power result in changes in the output signal of the Monitor 46. The output signal of the Monitor 46 is provided to an AC Power to DC Voltage Converter 47. The output signal of the Converter 47 therefore is a DC voltage, the level of which is directly related to the intensity of the light from the Lamp 12. This voltage is provided to a DC Voltage To Frequency Converter 48. The output signal of the Frequency Converter 48 is a Control Signal 25 the Frequency $f_o$, of which is directly related to the DC voltage level from the Power Converter 47 and thus also to the intensity of the Lamp 12.

The Control Signal 25 is input over the Line 23 to the Exposure Control Circuit 24 by way of a Ratio Divider 49. The Ratio Divider 49 also receives an input from a Reference Frequency Generator 51. The Reference Frequency Generator 51 provides an output signal which is representative of a Reference Frequency $f_r$. The Reference Frequency $f_r$ is selected to be in the order of 4.5 Khz because in the preferred embodiment, the Control Signal 25 is known to have a Frequency $f_o$ in the order of 4.5 Khz. For example, typically the Frequency $f_o$ of the Control Signal 25 will be in the order 4.3 to 4.7 Khz. The Frequency $f_o$ is approximately known because the intensity of the Lamp 12 varies linearly for a known power range. The Lamp is operated within this range and therefore the DC voltage level from the Power Converter 47 also is approximately known to be at a level resulting in a frequency near 4.5 Khz. The $f_r/f_o$ frequency ratio from the Ratio Divider 49 is coupled to a Counts/Interval Divider 52. The signal which is representative of the Reference Frequency $f_r$ from the Generator 51 is also provided to a Period Divider 53. The output signal $T_r$ of the Period Divider 53 is a signal representative of the period of the Reference Frequency $f_r$. The period $T_r$ also is provided as an input to the Counts/Interval Divider 52.

A Preset Exposure Time Generator 54 provides an output signal on the Line 56 which is representative of the required Time t that the light from the Lamp 12 must expose the Coating 17 to obtain the best results. The preferable total exposure time needed to properly expose the phosphors of the screen is dependent upon the light transmission characteristics of the Shadow Masks 19 through which the exposing light must pass. The shadow mask light transmission characteristics for various types and sizes of tubes vary and accordingly, the Preset Exposure time t must be changed as different types of Panels 16 are processed. The required exposure Time t can be set by the use of thumb wheel switches on the panel of the control system after the required exposure time for a particular type of shadow mask is determined. Alternatively, the Exposure Time t can be automatically set into the control system. The details of these various operations are fully described in previously referenced U.S. application Ser. No. 267,749, the disclosure of which is incorporated herein by reference.

The Total Exposure Time t is input to an Exposure Time Interval Divider 57 and divided into 10 equal exposure time intervals to provide a Time/Interval Signal $t_i$ on output Line 58. The intervals are used to facilitate an intermitten motion of the Panels 16 to eliminate vibration of the Shadow Masks 19 in a manner fully described in previously referenced U.S. Pat. No. 4,370,036. Accordingly, if the Dwell-Move Calculator 27 is eliminated, the Exposure Time/Interval Divider 57 also can be eliminated. The Exposure Time/Interval Signal T also is provided as an input to the Counts/Interval Divider 52. The Divider 52 thus provides a signal n which is indicative of the number of counts per interval of time that the Counter-Clock 29 must provide pulses to the Motor Control Circuit 36 in order to move the Panel 16 the desired distance in the required time. The Divider 62 processes the three input signals $t_1$, $t_r$ and Ratio in accordance with $n=((t_1 \div t_r)/\text{Ratio})$ and provides the Counts/Interval Signal n on Line 26. Accordingly, the Counts/Interval Signal n varies directly with variations in the intensity of the Lamp 12 time because these variations change the Frequency $f_o$ of the Control Signal 25. The $t_1$ and $t_r$ signals provided to the Divider 52 are constant for a particular shadow mask and the Ratio Signal from the Divider 49 varies directly with the Frequency $f_0$. Accordingly, the light intensity-exposure time multiple of the system remains constant.

The Counts/Interval Signal n is coupled by Line 26 to the input of the Dwell-Move Calculator 27 which controls the output pulse rate of the Counter-Clock 29. When the Dwell-Move Calculator 27 is eliminated from the system, the Output n is applied directly to the Counter-Clock 29.

The output Line 31 of the Counter-Clock 29 is connected to the Motor Control 36 and Shutter Control 34 by Lines 33 and 32, respectively. The output pulses from the Counter-Clock 29 thus serve as the clock pulses for these two circuits during the motion intervals from the Move-Dwell Calculator 27.

The Shutter Control 34 includes an AND Gate 59 having three input terminals. Accordingly, the AND Gate 59 provides an output pulse when inputs are simultaneously received from the Counter 29, the Motor Control 36 and the Preset Exposure Time 54. The output pulse from the AND Gate 59 is input to an OR Gate 61, which also can receive a Manual Input over a Line 62. The reception of either of these inputs causes the OR Gate 61 to provide an output signal on Line 37 and open the Shutter 21. The output signal from the OR Gate 61 also is input to a Shutter Closed Return Home Circuit 63, which in its simplist form can be a NOR Gate. The output of the Return Home Circuit 63 is provided by a Line 64 as an input to the Motor Control 36.

OPERATION OF THE PREFERRED EMBODIMENT

The system operation begins with the calibration of the system. The Lamp 12 is actuated by the Variable AC Input Source 14 and the intensity of the lamp output is measured. The AC Source 14 is adjusted to bring the lamp intensity into the range where intensity and power are linearly related and where proper exposure of all screens irrespective of shadow mask type is obtained. After the system is thus calibrated, it is ready to receive panels for exposure.

The preferred embodiment is utilized in an automatic processing line and accordingly, the Panels 16 are placed onto and removed from the Lighthouse 10 by an industrial robot, such as the type provided by Oy W. Rosenlew Ab, a corporation of Finland. Accordingly, the instant invention can be reduced to practice utilizing either discrete circuitry, or microprocessors which are combined with the programmable computer associated with the controller of the industrial robot. In the preferred embodiment microprocessors operating in cooperation with the programmable computer included with the robot are preferably utilized. Irrespective of the nature of the reduction of practice, the Preset Exposure Time t is input to the system. This input can be made by the setting of thumb wheel switches or by automatic transmission measurement equipment. In either event, the light transmission characteristics are changed for every type of shadow mask and this information is provided by the Preset Exposure Time Circuit 54.

The Reference Frequency Signal $f_r$ provided by the Signal Generator 51 is fixed for all types of shadow masks and accordingly, this signal is provided by the microprocessor of which the Exposure Control Circuit 24 is a part.

The faceplate Panels move along a processing line in random order of sizes and types. Because an industrial robot is utilized, the programmable memory characteristics of the robot permit the robot to "know" which type of panel is picked up. The panel type information can be provided by the robot controller manually by thumb wheel switches or automatically by sensing means, such as the output from scanning a bar coded label on the panel. Accordingly, the Preset Exposure Time required for a particular faceplate panel is known when the panel is placed on the Lighthouse 10 and the proper value is set into the Preset Exposure Time Circuit 54.

The Preset Exposure Time Signal t available on Line 56 is provided as an input to the AND Gate 59 of the Shutter Control Circuit 34. The AND Gate 59 also receives the output pulses from the Counter-Clock 29 over the Line 32, and the output of the Motor Control Circuit 36. When all input signals are preset, the AND Gate 59 actuates the OR Gate 61 and opens the Shutter 21 to expose the Coating 17 to the light from the Lamp 12.

With the Shutter 21 open, the Control Signal 25 from the Frequency Converter 48 is provided to the Ratio Divider 49. The ratio factor of the Ratio Divider 49 output varies with the Frequency $f_o$ of the Control Signal 25 to adjust the Counts/Interval Signal n from the Divider 52. The Counts/Interval Signal n controls the output of the Counter-Clock 29 either directly or through the Dwell-Move Calculator 27. The Counter-Clock 29 output serves as a clock signal to the Motor Control Circuit 36 to rotate the Motor 38 and move the Panel 16 with respect to the Lighthouse 10. When the Counter 29 counts down the number of counts demanded by the Counts/Interval Divider 52, the AND Gate 59 no longer actuates the OR Gate 61 and the Shutter 21 closes while the Shutter Closed Circuit 63 causes the Motor 38 to return to a home or neutral position. The Lamp 12 can be de-energized at this time if desired.

After the Shutter 21 is closed, the Panel 16 is removed from the Lighthouse 10 and replaced with another panel. If the light transmission characteristics of the shadow mask within the replacement panel are different from those of the previous panel, the Preset Exposure Time T is reset to adjust the output of the Counts/Interval Divider 52 to the new characteristics. Additionally, any power changes to Lamp 12 change the Frequency $f_o$ of the Control Signal 25 to change the output signal of the Counts/Interval Divider 52. Accordingly, the Intensity-Time multiple of the system is held constant for all types of faceplate panels and for variations of the power input to the system.

The system as described does not adjust for instantaneous changes in the intensity of light which do not result from a change of energizing power to the Lamp 12. Experience has shown that such adjustment is not required between the calibrations of the system. However, if desired, the light output from the Lamp 12 can be monitored with photo detectors, the outputs of which are used to change the power supply to the Lamp 12 by the Variable Source 14. Such power changes will change the Frequency $f_o$ to the Control Signal 25 resulting in instantaneous adjustment of the system.

What is claimed is:

1. In a lighthouse employed for exposing an actinic energy sensitive coating present on the inside surface of a picture tube panel and having an actinic energy source and a power supply for energizing said energy source, an improved system for maintaining a constant energy intensity-time relationship comprising:

means directly responsive to the energizing power provided to said actinic energy source for providing an output signal having a characteristic related to the intensity of said energy source;

means responsive to said output signal for providing a control signal, said control signal having a frequency determined by said output signal characteristic; and means responsive to said control signal for controlling the exposure of said actinic energy sensitive coating in accordance with said control signal frequency, said means responsive to said control signal including means for providing a reference signal representative of a reference frequency and means receiving said reference signal and said control signal frequency for providing a signal related to the ratio of said reference frequency and said control signal frequency.

2. The system of claim 1 wherein said means responsive to said control signal further includes means for establishing a preset signal related to a desired exposure time of said actinic energy sensitive coating, and wherein said means responsive to said control signal further includes means for receiving said preset exposure time signal and said ratio signal and providing a counts per interval signal.

3. The system of claim 2 wherein said system for maintaining a constant energy intensity-time relationship includes a motor responsive to said counts per interval signal whereby the rotation time of said motor is determined by said counts per interval signal.

4. The system of claim 3 wherein said characteristic related to intensity is voltage and wherein said means responsive to said output signal is a voltage to frequency converter.

5. The system of claim 4 wherein said system for maintaining a constant energy intensity time relationship further includes a digital counter responsive to said counts per interval signal whereby said motor is responsive to said counter.

6. The system of claim 5 wherein said system for maintaining a constant energy intensity-time relationship further includes means responsive to said counts per interval signal for dividing said preset exposure time signal into a pulse train representative of a plurality of equal time intervals and for providing said pulse train to said digital counter.

7. The system of claim 1 or 2 wherein said actinic energy source is a light source.

8. In a lighthouse having an actinic energy source utilized to expose an actinic energy sensitive coating on the surface of a kinescope faceplate to the output energy of said source, an improved method of maintaining a substantially constant exposure of said coating including the steps of:

monitoring the energizing power supplied to said energy source to obtain an energy intensity related signal;

converting said energy intensity related signal into a binary signal having a frequency dependent upon the intensity of said energy source;

determining a desired preset exposure time that said coating is exposed to said energy;

combining the binary signal and a signal representative of said desired preset exposure time to obtain an intensity-time determined signal;

providing a signal representative of a reference frequency;

comparing said reference frequency representative signal to said intensity dependent signal to obtain a ratio signal;

utilizing said ratio signal in obtaining said intensity-time signal and;

utilizing said intensity-time signal to control the exposure of said coating to said energy.

9. The method of claim 8 further including the steps of dividing said preset exposure time signal into a pulse train representative of a plurality of equal time intervals; and utilizing said ratio signal in said combining step to divide said intensity-time determined signal to obtain a number of counts per interval and controlling said exposure in accordance with said counts.

10. The method of claim 9 further including the step of utilizing said counts per interval to actuate a binary counter and utilizing the output of said counter to control said exposure.

* * * * *